(12) United States Patent
Chisum et al.

(10) Patent No.: US 11,181,668 B2
(45) Date of Patent: Nov. 23, 2021

(54) HIGH CONTRAST GRADIENT INDEX LENS ANTENNAS

(71) Applicant: University of Notre Dame du Lac, Notre Dame, IN (US)

(72) Inventors: Jonathan Chisum, Notre Dame, IN (US); Nicolas Garcia, South Bend, IN (US)

(73) Assignee: University of Notre Dame du Lac, Notre Dame, IN (US)

( * ) Notice: Subject to any disclaimer, the term of this patent is extended or adjusted under 35 U.S.C. 154(b) by 254 days.

(21) Appl. No.: 16/509,856

(22) Filed: Jul. 12, 2019

(65) Prior Publication Data

US 2020/0018874 A1 Jan. 16, 2020

Related U.S. Application Data

(60) Provisional application No. 62/697,487, filed on Jul. 13, 2018.

(51) Int. Cl.
*H01Q 15/02* (2006.01)
*G02B 3/00* (2006.01)

(52) U.S. Cl.
CPC .......... *G02B 3/0087* (2013.01); *H01Q 15/02* (2013.01)

(58) Field of Classification Search
CPC combination set(s) only.
See application file for complete search history.

(56) References Cited

U.S. PATENT DOCUMENTS

| | | | |
|---|---|---|---|
| 9,772,476 B2 | 9/2017 | Jeong et al. | |
| 2014/0342557 A1 | 11/2014 | Diem | |
| 2015/0044417 A1* | 2/2015 | Koike | B82Y 10/00 |
| | | | 428/137 |
| 2015/0048380 A1* | 2/2015 | Koike | H01L 22/12 |
| | | | 257/76 |
| 2016/0149079 A1* | 5/2016 | Koike | H01L 33/005 |
| | | | 257/79 |
| 2016/0216412 A1* | 7/2016 | Kintz | G02B 13/14 |
| 2016/0315394 A1* | 10/2016 | Roy | H01Q 15/02 |

OTHER PUBLICATIONS

Nicolas Garcia,"Silicon Micromachined High-contrast Artificial Dielectrics for Millimeter-wave Transformation Optics Antennas," Oct. 19, 2017,2017 IEEE International Symposium on Antennas and Propagation & USNC/URSI National Radio Science Meeting, pp. 1971-1972.*

John Brady,"Beamspace MIMO for Millimeter-Wave Communications: System Architecture, Modeling, Analysis, and Measurements," Jul. 7, 2013,IEEE Transactions on Antennas and Propagation,vol. 61,pp. 3814-3815,3821-2822.*

(Continued)

*Primary Examiner* — Omar S Ismail
(74) *Attorney, Agent, or Firm* — Michael Best & Friedrich LLP

(57) ABSTRACT

A film comprising a first plurality of voids is provided, wherein respective ones of the first plurality of voids have a regular n-gon geometry, and the first plurality of voids are arranged on a regular n-gon lattice having a first size. The film may comprise a second plurality of voids arranged on a regular n-gon lattice having a second size different from the first size. An optical element and manufacturing method are also provided.

18 Claims, 10 Drawing Sheets

(56) References Cited

OTHER PUBLICATIONS

Alkhateeb et al., "MIMO Precoding and Combining Solutions for Millimeter-Wave Systems", IEEE Communications Magazine, vol. 52, No. 12, pp. 122-131, Dec. 2014.

Brady et al., "Beamspace MIMO for Millimeter-Wave Communications: System Architecture, Modeling, Analysis, and Measurements", IEEE Transactions on Antennas and Propagation, vol. 61, No. 7, pp. 3814-3827, Jul. 2013.

Garcia et al., "Silicon micromachined high-contrast artificial dielectrics for millimeter-wave transformation optics antennas," 2017 IEEE International Symposium on Antennas and Propagation, 2 pages, Jul. 2017.

Hogan et al., "Beam Selection for Performance-Complexity Optimization in High-Dimensional MIMO Systems," 2016 Annual Conference on Information Science and Systems, pp. 337-342, Mar. 2016.

Hur et al., "Millimeter wave beamforming for wireless backhaul and access in small cell networks," IEEE Transactions on Communications, vol. 61, No. 10, pp. 4391-4403, Oct. 2013.

Kwon et al., "Transformation electromagnetics: An overview of the theory and applications," IEEE Antennas and Propagation Magazine, vol. 52, No. 1, pp. 24-46, Feb. 2010.

Larsson et al., "Massive MIMO for Next Generation Wireless Systems," IEEE Communications Magazine, vol. 52, No. 2, pp. 186-195, Feb. 2014.

Petosa et al., "Design and performance of a perforated dielectric fresnel lens," IEE Proceedings—Microwaves, Antennas and Propagation, vol. 141, No. 5, pp. 309-314, Oct. 1994.

Rappaport et al., "Millimeter wave mobile communications for 5g cellular: It will work!" IEEE Access, vol. 1, pp. 335-349, 2013.

Rizk et al., "Millimeter-Wave Fermi Tapered Slot Antennas on Micromachined Silicon Substrates", IEEE Transactions on Antennas and Propagation, vol. 50, No. 3, pp. 379-383, Mar. 2002.

Teichman et al., "Gradient Index Optics at DARPA," Institute for Defense Analyses, Tech. Rep. D-5027, <https://www.ida.org/ /media/Corporate/Files/Publications/IDA Documents/STD/D-5027-FINAL.ashx>, 69 pages, Nov. 2013.

Weir, "Automatic Measurement of Complex Dielectric Constant and Permeability at Microwave Frequencies," Proceedings of the IEEE, vol. 62, No. 1, pp. 33-36, Jan. 1974.

Xu et al., "Spatial and Temporal Characteristics of 60-Ghz Indoor Channels", IEEE Journal on Selected Areas in Communications, vol. 20, No. 3, pp. 620-630, Apr. 2002.

Zeng et al., "Millimeter Wave MIMO with Lens Antenna Array: A New Path Division Multiplexing Paradigm", IEEE Transactions on Communications, vol. 64, No. 4, pp. 1557-1571, Apr. 2016.

\* cited by examiner

HIGH CONTRAST GRADIENT INDEX LENS ANTENNAS

CROSS-REFERENCE TO RELATED APPLICATION(S)

This application claims priority to U.S. Provisional Patent Application No. 62/697,487, filed on Jul. 13, 2018, the entire contents of which are fully incorporated herein by reference.

STATEMENT REGARDING FEDERALLY SPONSORED RESEARCH

This invention was made with government support under grant number IIP1439682 awarded by the National Science Foundation. The government has certain rights in the invention.

BACKGROUND

Advances in transformation optics (TO) and field transformation lenses have motivated advances in gradient index (GRIN) optics, and in particular gradient index lenses and antennas. Transformation optics methods and gradient index electromagnetic structures rely upon spatially varied arbitrary permittivity. This, along with recent interest in millimeter-wave lens-based antennas, demands high spatial resolution dielectric variation.

Fabrication of GRIN lenses has been studied from additive and subtractive (traditional) manufacturing. Perforated media have been used to fabricate gradient index structures from microwaves to THz but are often limited in contrast. For example, circular voids have been mechanically drilled in a background dielectric as an approach for spatially varying permittivity throughout a bulk material.

SUMMARY

In one aspect, disclosed is a film having a first plurality of voids, wherein respective ones of the first plurality of voids have a regular n-gon geometry, and the first plurality of voids are arranged on a regular n-gon lattice having a first size.

In another aspect, disclosed is an optical element comprising: a first silicon film including a first plurality of voids; and a second silicon film disposed on the first silicon film, the second silicon film including a second plurality of voids, wherein respective ones of the first plurality of voids have a regular m-gon geometry the first plurality of voids are arranged on a regular m-gon lattice, respective ones of the second plurality of voids have a regular n-gon geometry, the second plurality of voids are arranged on a regular n-gon lattice, and the first silicon film has a first refractive index and the second silicon film has a second refractive index.

In yet another aspect, disclosed is a method of manufacturing a silicon film including providing a silicon wafer and forming a first plurality of voids, wherein respective ones of the first plurality of voids have a regular n-gon geometry, and the first plurality of voids are arranged on a regular n-gon lattice having a first size.

DETAILED DESCRIPTION

Figure 1A:
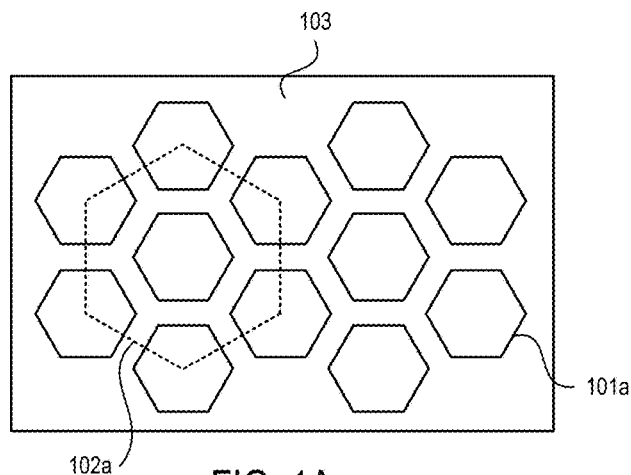
FIGS. 1A-1D illustrate exemplary films in accordance with various aspects of the present disclosure.

In one aspect, disclosed are contiguous, tiled polygon unit cells that function as basic building block for gradient index lenses for millimeter wave and microwave antennas, for example.

In another aspect, the present disclosure enables higher contrast permittivity ranges, which allows for more extreme optical designs, such as flatter lenses.

In yet another aspect, the present disclosure is used in low cost and low power antennas for millimeter wave beam steering, which may allow wide area deployment of millimeter wave access points for 5G communications, for example.

By employing regular polygon unit-cells (e.g. hexagon, square, or triangle) on matched lattices, very high contrast permittivity ranging from, for example, 0.05 to 1.0 of the background permittivity has been realized. In one exemplary aspect, silicon micromachining (e.g. Bosch process) is performed on high resistivity silicon wafers to achieve a minimum permittivity of 1.25 (10% of silicon) in the WR28 waveguide band, targeting the proposed 39 GHz 5G communications band. In certain aspects, the present disclosure is applicable into the THz band.

1. Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present disclosure. All publications, patent applications, patents, and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other aspects "comprising," "consisting of" and "consisting essentially of," the aspects or elements presented herein, whether explicitly set forth or not.

The conjunctive term "or" includes any and all combinations of one or more listed elements associated by the conjunctive term. For example, the phrase "an apparatus comprising A or B" may refer to an apparatus including A where B is not present, an apparatus including B where A is not present, or an apparatus where both A and B are present. The phrases "at least one of A, B, . . . and N" or "at least one of A, B, . . . N, or combinations thereof" are defined in the broadest sense to mean one or more elements selected from the group comprising A, B, . . . and N, that is to say, any combination of one or more of the elements A, B, . . . or N including any one element alone or in combination with one or more of the other elements which may also include, in combination, additional elements not listed.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

The term "permittivity" is used herein to mean the measure of resistance that is encountered when forming an electrical field in a particular medium. The term "background permittivity" is used herein to mean non-ferroelectric contributions to the total polarization in a material. The term "effective permittivity" (also referred to as "effective dielectric constant") takes into account that—although a majority of electric fields are constrained with a substrate—a fraction of the total energy exists within the air above the substrate, such as in the case of non-TEM transmission lines realized in microstrip media, for example. Effective permittivity is described in more detail below.

2. Introduction

The effective permittivity of a given perforation, or void, on a lattice unit-cell can be approximated as:

$$e_{\mathit{eff}} = \epsilon_r(1-\alpha) + \alpha \tag{1}$$

where $\epsilon_r$ is the relative permittivity of the background dielectric and $\alpha$ is the filling factor equal to the ratio of the void area to the unit-cell area. For circular unit-cells on square and triangle lattices, the maximum fill factor is equal to $\pi/4$ and $\pi/(2\times3^{1/2})$, respectively. If the background permittivity is that of silicon, $\epsilon_r=11.8$, the corresponding minimum effective permittivity is 3.3 and 2.0, respectively, which limits the fabrication of many GRIN lens designs using the circular unit-cells. For example, the permittivity of a flat lens varies from a maximum value (dependent on the thickness of the lens) to that of air.

Silicon micromachined perforated media for application in millimeter-wave TO and GRIN antenna designs are described herein. For example, the Bosch Deep Reactive Ion Etch process in undoped, high-resistivity silicon wafers was used to maximize the range of realizable permittivity and emphasize fill factors approaching $\alpha=1.0$, while maintaining manufacturability and remaining self-supporting ($\alpha=1.0$ is a null wafer in which the silicon has been completely etched away).

As disclosed herein, photolithographic drilling (versus mechanical drilling) permits arbitrary perforation cross sections on arbitrary lattices that also meet sub-wavelength unit-cell requirements at millimeter-waves. To approach the minimum permittivity of air, the set of all regular lattice n-gons (n=3, 4, and 6 corresponding to triangles, squares, and hexagons, respectively) capable of tiling the plane was fabricated on their corresponding n-gon lattices. Each has the property that as the characteristic dimension of the void approaches that of the unit-cell, $\alpha=1$ and $\epsilon_{\mathit{eff}}=\epsilon_r$.

3. Films

Disclosed herein are films having a plurality of voids each having a regular n-gon geometry and being arranged on a regular n-gon lattice. The value of n is be equal to 3, 4, or 6.

In certain aspects, the disclosed films comprise, consist essentially of, or consist of silicon. In certain other aspects, the disclosed films may be made of any material suitable for use in a dry etching process, preferably reactive-ion etching, more preferably deep reactive-ion etching (e.g. Bosch process). In yet other aspects, the disclosed films may be made of any material suitable for use as gradient index optical elements. Suitable film materials may include silicon, polysilicon, doped silicon, silicon oxide, silicon suboxide, germanium, a III-V semiconductor (such as GaAs), diamond, sapphire, a metal oxide (such as ITO), an organic polymer, or combinations thereof.

In certain aspects, the film may have an effective permittivity between about 1.0 (air) and a characteristic maximum based on the film material. For example, a silicon film may have an effective permittivity between about 1.0 and about 11.8 (bulk silicon). In certain aspects, the silicon film may have a minimum effective permittivity less than about 11.8, about 11.0, about 10.0, about 9.0, about 8.0, about 7.0, about 6.0, about 5.0, about 4.0, about 3.0, about 2.0, about 1.9, about 1.8, about 1.75, about 1.7, about 1.6, about 1.5, about 1.4, about 1.3, about 1.25, about 1.2, about 1.1, or about 1.05. The minimum effective permittivity may be determined by the size of the n-gon voids (see, for example, FIGS. 1 and 2 and accompanying text).

In certain aspects, a higher effective permittivity may contribute to a thinner optical element (e.g. a lens comprising layers of silicon films), whereas a lower effective permittivity may contribute to improved beam steering but reduced mechanical stability.

4. Optical Elements

Gradient index (GRIN) optical elements, preferably gradient index lenses and/or antennas, rely upon spatially varied arbitrary permittivity. In other words, optical effects are produced by a gradual variation of the refractive index of a material.

In certain aspects, two or more films according to the present disclosure are stacked together in a layered arrangement to form a GRIN optical element, such as a lens or an antenna. Each film, preferably a silicon film, may contain a plurality of voids each having a regular n-gon geometry and being arranged on a regular n-gon lattice. The value of n may be equal to 3, 4, or 6.

The number of layered films in the optical element is not limited. Each film in the stack of layered films is preferably a film according to the present disclosure. For example, a GRIN lens may comprise a stack of j films, each of the j films having an $n_k$-gon geometry and an $n_k$-gon lattice, where k is a film layer index ranging from 1 to j. Typically, all values of $n_k$ are the same but this need not be so.

Two or more of the films may have different refractive indices, such that a gradient of refractive index is achieved through the optical element (perpendicular to the layered stack). For example, a first film may have a first refractive index and a second film may have a second refractive index different from the first refractive index. In an optical element comprising j films, for example, each film may have a different refractive index, $m_k$, where k is a film layer index ranging from 1 to j. Preferably, the refractive index of the lens monotonically increases or decreases from one end of the optical element to the other (e.g. $m_1<m_2<\ldots<m_{j-1}<m_j$).

Alternately or additionally, one or more films of an optical element may have an in-plane gradient of the refractive index, such that the center of a film has a different in-plane refractive index than at an edge of the film. For example, a film may have larger n-gon voids at its center and smaller n-gon voids at its edges, or vice versa. The in-plane gradient of the film may be approximately continuous, such that a function of the in-plane refractive index $l(x,y)$ is differentiable. A continuous in-plane gradient may be achieved by a continuous increase or decrease in the size of the voids as a function of the distance from the center of the film, for example. The in-plan gradient may be further extended by incorporating various host background materials within the same layer (e.g., concentric rings of various host materials).

In the case of an optical element comprising films with a gradation of refractive indices both through the films (z-axis) and in the plane of one or more of the films (x,y plane), the refractive index of the optical element may vary approximately continuously from a given point (x,y,z) in the optical element to a nearby point, such as (x+Δ, y, z), (x,y+Δ,z), or (x,y,z+Δ).

5. Manufacture

Also disclosed are methods of manufacturing films useful for GRIN optical elements. The method comprises providing a substrate and forming a plurality of voids each having a regular n-gon geometry and being arranged on a n-gon lattice of the substrate material. Preferably, the substrate is a silicon wafer.

In certain aspects, the step of forming a plurality of voids comprises a photolithographic drilling process. Unlike typical mechanical drilling processes, photolithographic drilling is capable of forming non-circular voids with high precision, the voids preferably having approximately vertical sidewalls. The photolithographic drilling process may include etching, preferably dry etching, more preferably ion-reactive etching or deep ion-reactive etching, most preferably Bosch deep reactive ion etching.

Briefly, the Bosch process is a high-aspect ratio plasma etching process. The process includes cycles of etching and protection film deposition by quick gas switching. During the etching mode, ions attack the substrate (e.g. silicon wafer) from a nearly vertical direction. Sulfur hexafluoride ($SF_6$) is commonly used as an etchant for silicon, for example. The protection mode is a deposition of a chemically inert passivation layer, such as octafluorocyclobutane ($C_4F_8$). Each phase typically lasts for several seconds. The passivation layer protects the entire substrate from further chemical attack and prevents further etching. During the etching phase, however, directional ions bombard the bottom of the substrate and attack the passivation layer, exposing the bottom of the substrate to the chemical etchant. The etch/deposit steps are typically repeated many times, each etch step taking place only at the bottom of the etched pits. Shorter cycles may tend to yield smoother, more uniformly vertical walls at the expense of etch rate.

In certain aspects, the voids may be formed only partway through a film.

Additionally, a film substrate may be etched partway, flipped over, and etched on the other side to form a through-hole. Although photolithographic drilling is preferred, any process capable of forming plurality of voids each having a regular n-gon geometry and being arranged on a n-gon lattice of the substrate material is suitable.

Examples

FIGS. 1A-3C respectively illustrate various examples of films according to various aspects of the present disclosure. Specifically, FIGS. 1A-1D respectively illustrate films 103 having hexagon voids 101a-101d on a hexagon lattice 102a-102d; FIGS. 2A-2C respectively illustrate films 203 having square voids 201a-201c on a square lattice 202a-202c; and FIGS. 3A-3C respectively illustrate films 303 having triangle voids 301a-301c on a triangle lattice 302a-302c. For illustration purposes, the films are differentiated from one another based on a characteristic dimension of the voids and/or a characteristic dimension of the lattice. In the examples illustrated in FIGS. 1A, 2A, and 3A, the characteristic dimension of the voids is 175 μm. In the examples illustrated in FIGS. 1B, 1D, 2B, and 3B, the characteristic dimension of the voids is 100 μm. In the examples illustrated in FIGS. 1C, 2C, and 3C, the characteristic dimension of the voids is 25 μm. In the examples illustrated in FIGS. 1A-1C, 2A-2C, and 3A-3C, the characteristic dimension of the lattice is 200 μm. In the example illustrated in FIG. 1D, the characteristic dimension of the lattice is 125 μm. For clarity of illustration, only a portion of the films are shown. In practical implementations, voids are tiled across the entirety (or a large portion) of the film surface.

To explore effects on mechanical strength and manufacturability, the hexagon, square, and triangle features on a 200 μm lattice spacing ($\lambda_g$/11 at 39 GHz) or 125 μm lattice spacing, with characteristic dimensions d=175 μm, 100 μm, and 25 μm (as illustrated in FIGS. 1A-3C) were fabricated. The maximum feature size, d=175 μm, had a supporting bridge of width 50 μm between each void. Comsol finite-element simulations of a 150 μm square perforation showed maximum surface stress to be much less than the yield strength of silicon, indicating that 175 μm perforations should also be self-supporting.

Each feature in FIGS. 1A-3C was exposed onto 25.4 mm, 280 μm thick undoped <111> intrinsic float-zone silicon wafers with greater than 2000 Ω-cm resistivity. The wafers were coated with 12 μm of 4620 photoresist (following the thick photoresist recipe). After development, the samples were placed in an Alcatel 601E inductively coupled reactive ion etcher and anisotropically etched with a DRIE Bosch process for 45, 60, and 120 minutes (for 175 μm, 100 μm, and 25 μm features, respectively). The 25 μm minimum feature size was chosen because of the mask machine used, but in principle minimum voids could be arbitrarily small (sub-micron) and therefore maximum permittivity could be approximately that of the background permittivity.

Each geometry was arrayed in 6.9 mm×3.4 mm rectangles corresponding to the inner dimensions of a WR28 rectangular waveguide (dimensions 7.112 mm×3.556 mm). Several rectangular samples were stacked in a quarter-wave section of WR28 rectangular waveguide and scattering parameters were measured across the waveguide band from 26.5 GHz to 40 GHz. A thru-reflect-line (TRL) calibration was performed to set the reference plane at the entrance ports of the quarter-wave section and the Nicolson-Ross Weir method was used to extract the effective permittivity from scattering parameters.

It was found that significant mismatches at the air-silicon interface caused poor measurement accuracy and so the Nicolson-Ross Weir method was augmented to include impedance matching sections in the waveguide. The complete material stack-up placed inside the waveguide consisted of three 0.2794 mm thick silicon samples placed between two impedance matching Rogers 4350B substrate samples, each 0.7366 mm thick and with a measured dielectric constant of 3.7. Measurements were also highly sensitive to the air-gap between the top of the silicon samples and the top of the waveguide, so the 76 µm gap was accounted for in the permittivity extraction. The measurement setup was validated with samples of un-etched bulk silicon with measured $\epsilon_r$=12.0.

Figure 1B:
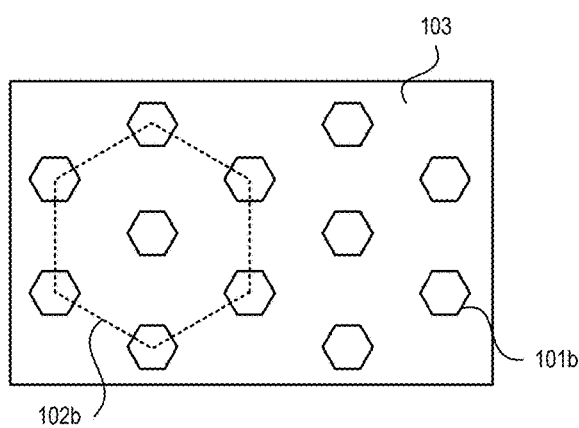
Figure 1D:
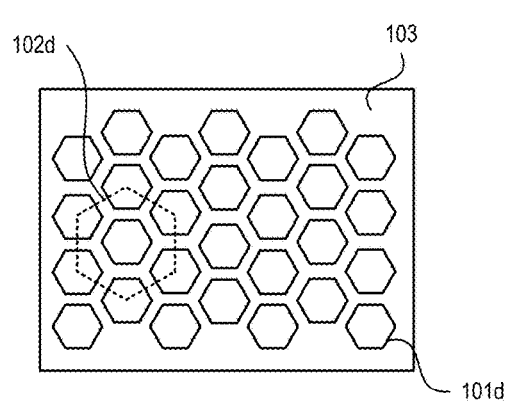
Figure 1C:
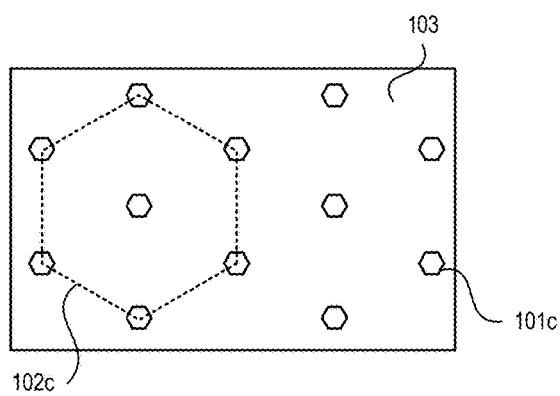
Figure 2A:
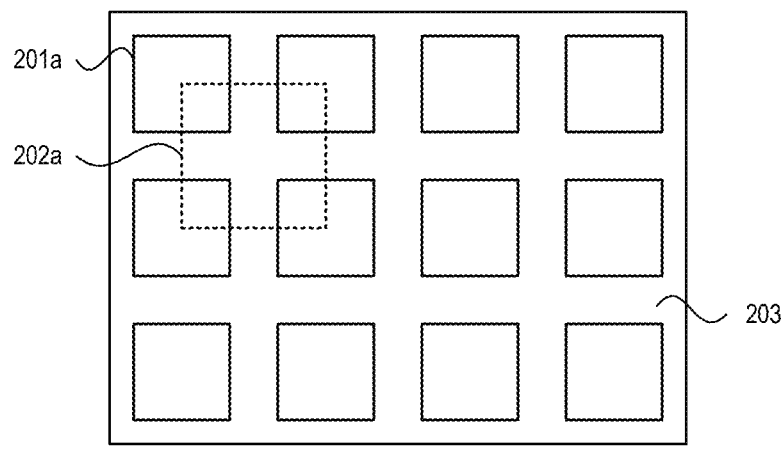
FIGS. 2A-2C illustrate exemplary films in accordance with various aspects of the present disclosure.
Figure 2B:
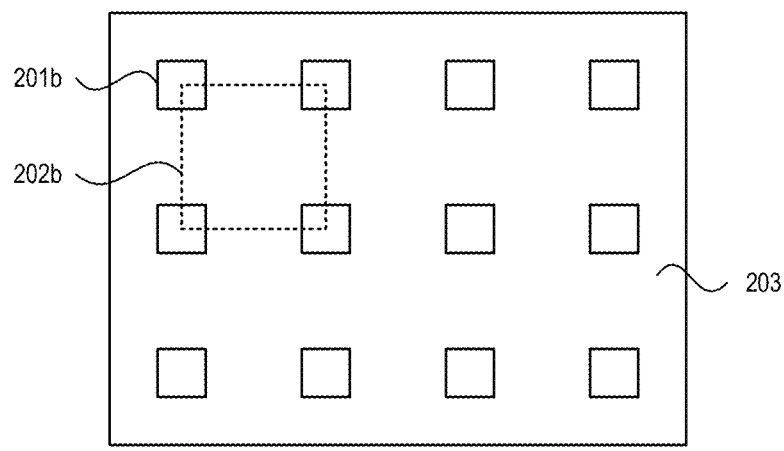
Figure 2C:
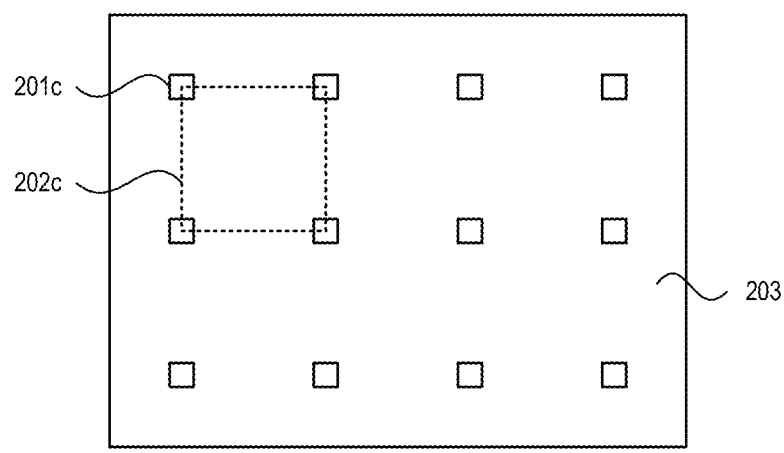
Figure 3A:
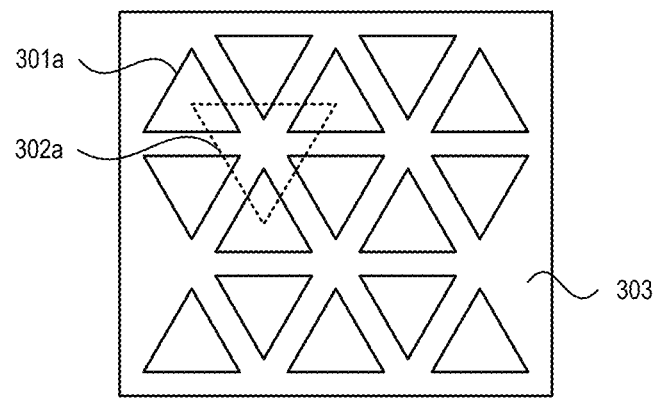
FIGS. 3A-3C illustrate exemplary films in accordance with various aspects of the present disclosure.
Figure 3B:
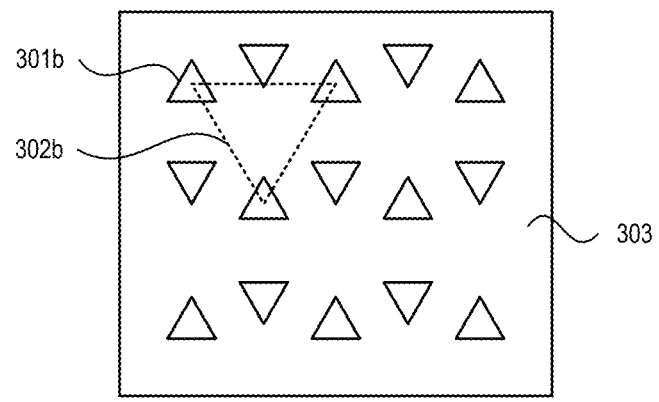
Figure 3C:
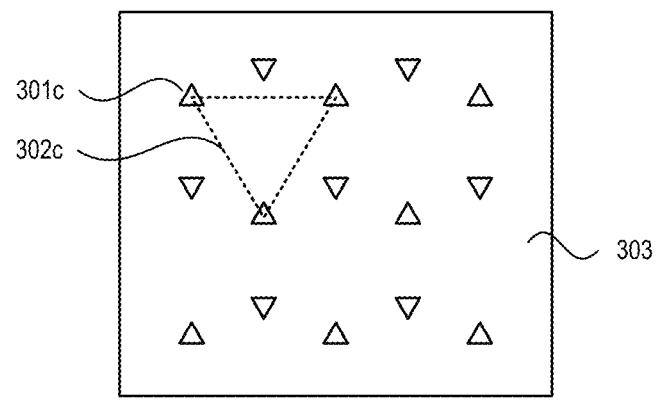
Figure 4:
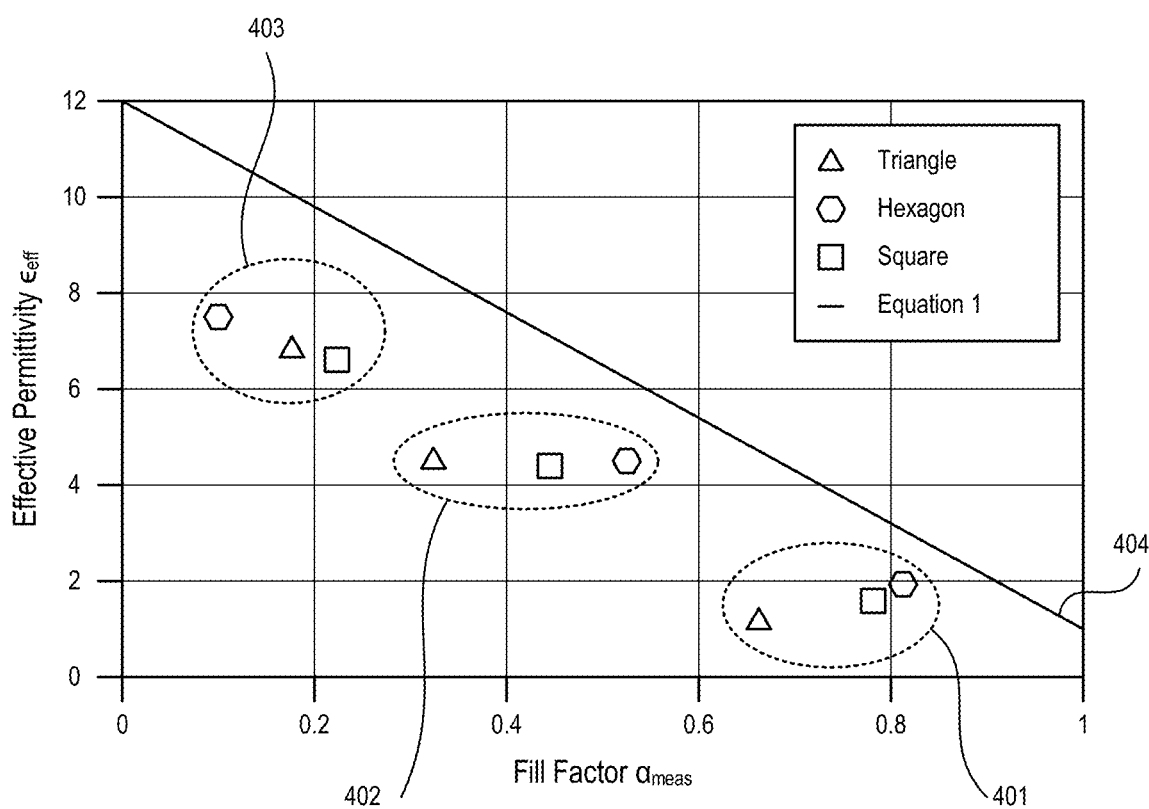
FIG. 4 illustrates the average permittivity of each perforation geometry at each feature size illustrated in FIGS. 1A-1C, 2A-2C, and 3A-3C.

FIG. 4 shows measured effective permittivity for each geometry as a function of measured fill factor, $\alpha_{meas}$ for the examples illustrated in FIGS. 1A, 2A, and 3A (group 401); the examples illustrated in FIGS. 1B, 2B, and 3B (group 402); and the examples illustrated in FIGS. 1C, 2C, and 3C (group 403). FIG. 4 also illustrates equation (1) as line 404. Nominal fill factors were designed to be $\alpha_{nom}$=0.016, 0.25, and 0.77, but due to over-etching fill factors were larger. The lowest permittivity in this example was $\epsilon_{eff}$=1.25 with large triangular features. Generally, measured permittivity is lower than equation (1) predicts, which may be attributed manufacturing tolerances in creating the particular example illustrated. For example, a 50 µm change in the gap can shift permittivity by as much as 2.

As can be seen from FIG. 4, the effective permittivity $\epsilon_{eff}$ generally decreases as the fill factor $\alpha_{meas}$ increases (that is, as the voids become a larger portion of the whole. This may be accomplished by making the voids smaller while holding the lattice size constant, as is shown by FIGS. 1A-1C in comparison to one another, for example. This may also be accomplished by holding the void size constant while decreasing the lattice size, as shown by FIGS. 1B and 1D in comparison to one another, for example. In some aspects of the present disclosure, both the void size and the lattice size may be varied in order to achieve a particular fill factor. This holds true for hexagon, square, and triangle lattices.

It was expected that the fill factors would be nearly identical across geometries for a given feature size, but back-side features may deviate from the theoretical ideal due to over-etching. At small feature sizes (25 µm), where the features are over-etched due to longer etch time, this effect results in a widening of the square and triangular features at the end of the etch. This corresponds to undercut, especially for the triangular features. The effect is far less pronounced for the small hexagons—the resulting permittivity is higher.

However, the effect appears to be reversed for the 100 µm and 175 µm feature sizes. Here, the total etch time is much smaller and results in minimal over-etch; larger features tend to etch faster and with greater resolution. The preference for deviations from ideal is only barely present in medium features (slightly rounded edges) and completely absent in larger features. The dominant phenomenon is the tendency of larger features to etch faster; they experience greater undercut, larger fill factors, and therefore lower permittivities.

In summary, triangle, square, and hexagon perforations of small (25 µm), medium (100 µm), and large (175 µm) feature sizes on a 200 µm lattice in silicon were fabricated. A minimum permittivity of 1.25 was measured, which corresponds to 10% of the background permittivity and enables flexibility when realizing TO designs and GRIN lenses. It is expected that modifications in small feature etching (to account for over-etch) will allow the measured permittivity to more closely approach the theoretical maximum permittivity for silicon of $\epsilon_r$=11.8.

6. Applicability for Mobile Devices

The likely development of mobile wireless in millimeter-wave (mmWave) bands brings with it the promise of wide-band channels and almost unlimited spatial reuse. However, to take advantage of this underutilized spectrum, several factors should be considered. The dominant characteristic of millimeter-wave propagation is increased path loss. To realize a practical network under such constraints, antenna arrays with high gain, beam-steering, and massive MIMO processing may be utilized.

Traditional beam-steering approaches include digital baseband beamforming, analog RF/LO beamforming, and hybrid beamforming. Full digital beamforming requires a data-converter and RF transceiver on every antenna element and is therefore prohibitive at 5G channel bandwidths. Analog beamforming requires only a single data-converter and transceiver but only has one stream. Hybrid beamforming is as a compromise between digital and analog beamforming: in an N-element antenna array, M<<N baseband data-converters can be combined with N RF phase shifters to provide high performance beamsteering, high-gain, and M independent data streams. However, hybrid beamforming has its limitations, namely cost, power and sensitivity to analog impairments due to finite resolution, lossy mmWave phase shifters. In addition, signals from multiple angles of arrival (AoA) are incident upon all receive chains and so linearity requirements are increased.

Moving to a large beamsteering array may allow for the leverage of the benefits of massive MIMO, including high-gain and spatial multiplexing. Both are native beam-space concepts and so lens antennas, fundamentally beam-space devices, have been proposed as ideal apertures for mmWave MIMO. A key advantage of lenses is inherent angle- or beam-space selectivity. With a single RF chain a stream incident from any angle can be received with high gain. Reception of a specific beam from an AoA requires minimal processing and is realized in the completely passive lens medium. With M RF chains, M independent streams from M angles of arrival can be received. Due to significant attenuation of multipath components, the typical number of paths (and therefore approximately the number of AoAs) in mmWave bands is L=2-8; therefore a lens antenna with 2-8 transceivers and data-converters can capture all significant paths from any AoA up to the field of view (FOV) of the antenna. An ideal lens antenna can achieve maximum MIMO capacity equal to L times the channel capacity, where L is the number of spatial-multiplexed streams. A practical lens can approach this value only if every spatial stream emitted by the transmitter is intercepted by the receiver. Therefore, any lens antenna for mmWave MIMO applications should have a large FOV to capture all L streams.

A beam-forming lens antenna with wide FOV suitable for use in small-form-factor platforms, such as small-cells and even mobile devices, is disclosed herein. The lens is designed with transformation optics and realized as a gradient index (GRIN) lens using stacked layers of perforated dielectric, such as the films including a lattice of polygonal voids described above. Because the disclosed process is based on photolithography, etching is parallel and therefore arbitrarily complex lenses can be fabricated for no additional cost and with negligible effect on fabrication time. From start to finish, each layer (wafer) of the GRIN lenses requires between 1 to 2 hours of etch time in the illustrated example, and since wafers are etched in batches, an entire lens can be etched in the same amount of time.

Figure 5:
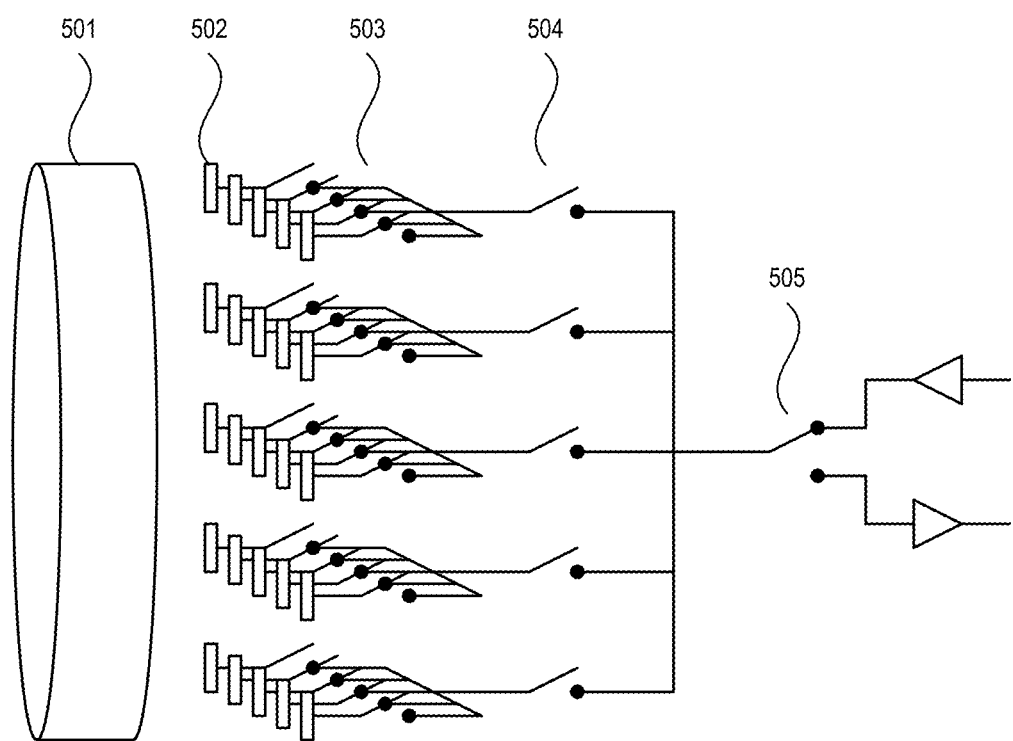
FIG. 5 illustrates an exemplary flat lens antenna in accordance with various aspects of the present disclosure.

FIG. 5 illustrates an exemplary flat lens antenna in accordance with this concept. The lens design is based on a flat Luneburg lens (FLL) fabricated with a stack of perforated silicon wafers. The FLL provides beam-steering by directing the RF signal to a particular feed element. The feed element (x, y) location dictates the beams ($\theta$, $\varphi$). The feed network is driven by an RF stream (single stream shown for clarity) through a matrix of solid-state switches. Importantly, mmWave switches are simpler to realize, lower loss, and require less power than variable phase shifters. The switch matrix is only shown for concept clarity and is not the focus of this disclosure.

As illustrated in FIG. 5, the flat lens antenna includes a FLL 501; a plurality of feed elements 502 arranged in an array; a plurality of column switches in a switch matrix 503, respective ones of which control a corresponding feed element 502; a plurality of row switches 504, respective ones of which control a corresponding set of column switches; and a T/R switch 505. Collectively, the FLL 501 and the plurality of feed elements 502 may form a set of passive wafers; and the switch matrix 503, the plurality of row switches 504, and the T/R switch 505 may form a set of active wafers.

The FLL 501 is designed with transformation optics. Transformation optics (TO) is a means of mapping a spatial distortion into a transformation of the material constitutive parameters (permittivity, $\varepsilon_r$, and permeability, $\mu_r$). A coordinate transformation from physical space, (x, y, z) to virtual space (x', y', z') is defined; the transformation is used to modify the permittivity and permeability tensors of an original design; and the result is a spatial map of $\varepsilon_r$ and $\mu_r$, which realize the functionality of the original structure in the physically transformed device.

This process can be applied to the Luneburg lens, which is a spherical lens whose permittivity varies from $\varepsilon_r$=2 at the center of the lens to $\varepsilon_r$=1 at the surface, as shown in FIG. 4a.

$$\epsilon_r = \left(2 - \frac{x^2 + y^2}{R^2}\right) \times \text{eye}(3, 3) \tag{2}$$

The spherical lens is converted to a cylinder with a compression ratio, $\delta$, which is introduced to compress the vertical, y, axis:

$$x' = x \tag{3}$$

$$y' = (\delta \times y)/\sqrt{R^2 - x^2} \tag{4}$$

$$z' = z \tag{5}$$

Computing the Jacobian transfer matrix, J, for the above coordinate transformation, the primed material can be computed:

$$\epsilon'_r = \frac{J \epsilon_r J'}{\det J} \tag{6}$$

which can be presented in terms of the original coordinates as shown in (7) and (8):

$$\epsilon'_{rxx} = \epsilon'_{rzz} = -\sqrt{R^2 - x^2} \times \frac{\frac{x^2 + y^2}{R^2} - 2}{\delta} \tag{7}$$

$$\epsilon'_{ryy} \triangleq 1 \tag{8}$$

Figure 6A:
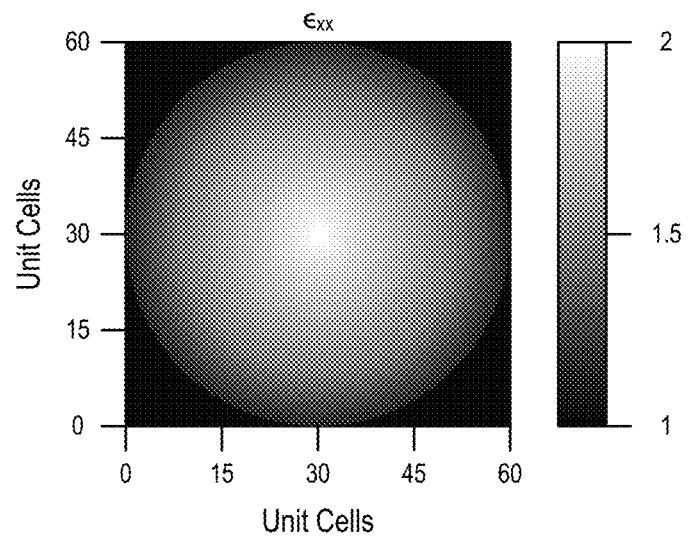
FIGS. 6A-6B respectively illustrate a permittivity map for the original Luneburg lens, and a permittivity map for the flat Luneburg lens.
Figure 6B:
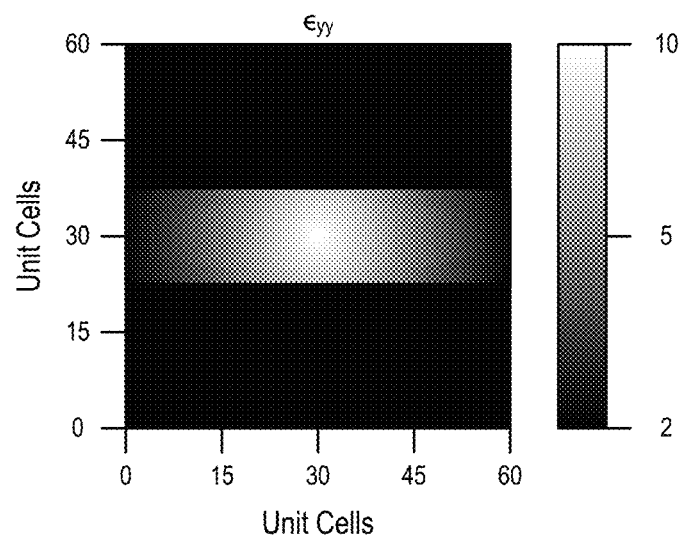

The resulting permittivity map is shown in FIG. 6B, from which it can be seen that the length of the lens remains the same while the width is squeezed to $\delta$ in comparison to the permittivity map shown in FIG. 6A. The permittivity distribution looks similar but is compressed. The electrical thickness must be much greater in the squeezed direction, which results in a maximum permittivity of 2/$\delta$. In the design shown in FIG. 6B, the maximum permittivity corresponds to $\varepsilon_{rmax} \approx 12$ at the center with a squeeze ratio of 1/6. The minimum permittivity is still $\varepsilon_{rmin}$=1 at the edges.

The lens design is fully prescribed in FIG. 6B and now fabrication is considered. By realizing the permittivity gradient with a perforated silicon dielectric, for example, an effective permittivity can ideally range from 1 to 11.8. The effective permittivity of a perforated dielectric can be approximated as:

$$\epsilon_{eff} = \epsilon_r(1-\alpha) + \alpha \tag{9}$$

where $\varepsilon_r$ is the relative permittivity of the background dielectric and a is the filling factor equal to the ratio of the void area to the unit-cell area. By way of comparison, for circular unit-cells on square and triangle lattices, the maximum fill factor is equal to $\pi/4$ and $\pi/(2 \times 3^{1/2})$, respectively. The permittivity map contains unit-cells with $\varepsilon_r$=1.0. Achieving a minimum permittivity close to 1.0 is crucial for wide angle beam-steering of the lens. If the background permittivity is that of silicon, $\varepsilon_r$=11.8, the corresponding minimum effective permittivity of the square and triangle configurations are 3.3 (28% of the background permittivity) and 2.0 (17% of the background permittivity) respectively, which significantly limits the fabrication of many TO designs.

In order to approach $\varepsilon_{rmin}$=1.0, the use of n-gon voids on matched lattices is disclosed and demonstrated herein. Theoretically the minimum permittivity can approach 1.0 as the volume of unetched dielectric becomes asymptotically small. Silicon wafers with permittivities as low as $\varepsilon_r$=1:25, or 10% of the background permittivity, have been fabricated in the above examples. For example, FIGS. 1A-3C show square, triangular, and hexagonal unit-cells on matched lattices. These structures were examined for robustness to manufacture and for their ability to exhibit a minimum permittivity. Features are exposed on an undoped silicon wafer with a diameter of 25.4 mm and a thickness of 270 µm. Etching can be performed with a Bosch process, for example. The resulting permittivities are shown in FIG. 4 where the minimum permittivity value for the triangle structure is 1.25, which agrees with the permittivity map constraints discussed above. Current Bosch etches exhibit undercut; addressing this effect will improve etch control.

Ansys HFSS can be used to explore the performance limitations of such a beam-steering lens antenna under the above fabrication limitations. It is important to determine the permittivity range and in particular minimum effective permittivity to achieve wide angle beam-steering.

If fabrication is constrained to unit-cell structures having circular voids, minimum permittivities will be 28%, 17%, and 10% of the background permittivity for square, triangle, and hexagon lattices, respectively. For a silicon background of $\varepsilon_r=11:8$, the minimum permittivities are 3.3, 2.0, and 1.25. Truncating the permittivity map from FIG. 6B with these values allows for counting the percentage of unit-cells that are effected by the fabrication limitations, as summarized in the following table. The background $\varepsilon_r$ corresponds to base lens material of silicon ($\varepsilon_r=11.8$), and two potentially higher permittivities of $\varepsilon_r=20$ and $\varepsilon_r=50$ (corresponding to lens compression ratios of 6, 10, and 25, respectively). For a silicon lens having circular voids on a square lattice where the minimum fabricated permittivity is $\varepsilon_{rmin}=0.28\varepsilon_r=3.3$, 12% of the unit cells in the design will have required permittivities below that of the fabrication limit. However, the same lens fabricated having hexagonal voids on a hexagonal lattice can realize a minimum fabricated permittivity of $\varepsilon_{rmin}=0.10\varepsilon_r=1.25$, resulting in only 2% of prescribed cells being below the minimum fabrication limit. Lenses fabricated with a fewer number of prescribed cells below the fabrication limit will more faithfully realize the desired lens response. The table shows that unit-cell structure—not thickness—is the more important consideration for realizing the designed lens permittivity map.

| Background $\varepsilon_r$ | Square lattice ($\varepsilon_{rmin} = 0.28\varepsilon_r$) | Triangle lattice ($0.17\varepsilon_r$) | Hexagon lattice ($0.10\varepsilon_r$) |
|---|---|---|---|
| $\varepsilon_r = 11.8$(Si) | 12.29 | 5 | 2.02 |
| $\varepsilon_r = 20$ | 12.7 | 5.164 | 1.844 |
| $\varepsilon_r = 50$ | 12.67 | 5.16 | 1.84 |

Figure 7:
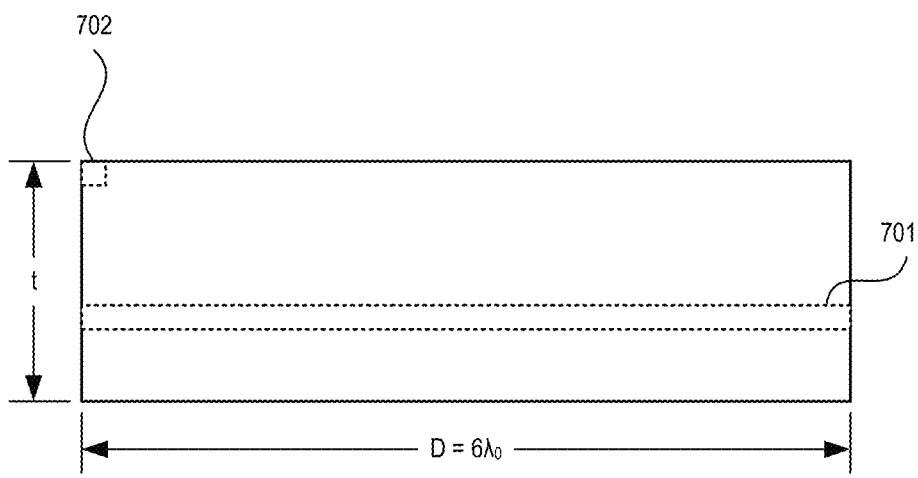
FIG. 7 illustrates a model lens for electromagnetic simulations.

FIG. 7 shows a cross-section of the final lens used for full-wave electromagnetic simulations. It is a rotational extrusion of the truncated permittivity maps. The lens comprises a series of stacked wafers 701, formed as a 64×10 array of unit-cells 702 of size 720 µm×720 µm. The lens diameter D is equal to 6λ, where λ is 7.7 mm, the free-space wavelength at 39 GHz. The associated thickness t is 0.94λ=7.2 mm. The focal point is 7.7 mm, which is almost identical to that of the typical Luneburg lens.

Figure 8:
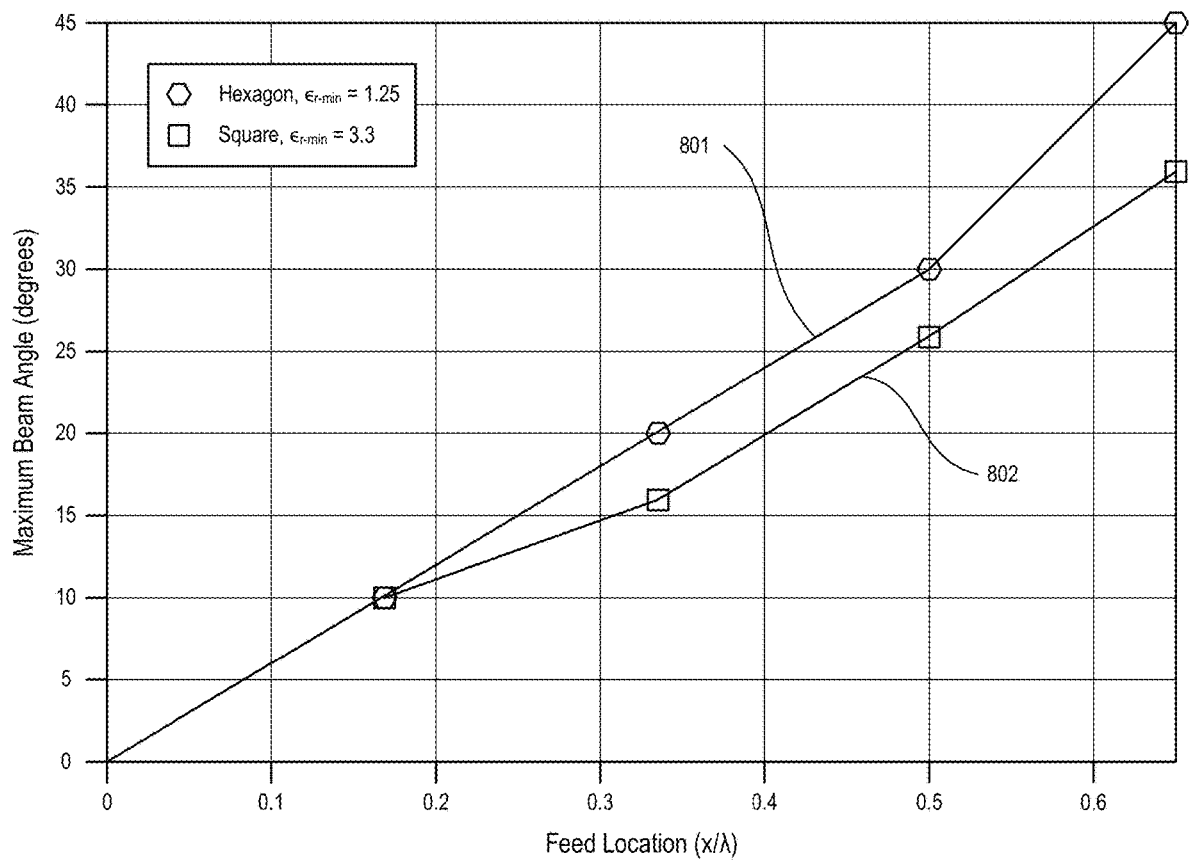
FIG. 8 illustrates a plot of maximum steered angle versus feed location for lenses with minimum $\varepsilon_r$ of 1.25 and 3.3, respectively.

FIG. 8 shows the maximum beam steering angle versus feed location for the silicon lens fabricated with hexagon 801 and square 802 unit-cell configurations with minimum permittivity of 3.3 and 1.25, respectively. At shallow scan angles the two lenses perform identically because the majority of the energy propagates throughout the center of the lens where permittivity is much higher than $\epsilon_{rmin}$. However, as beam scan angle increases, the hexagon unit-cell with $\epsilon_{rmin}=1.25$ outperforms the square unit-cell. As scan angle increases, the edge of the lens plays a more prominent role in beam-steering and the edge of the lens contains the lower permittivity unit-cells.

In summary, an n-gon void on a matched lattice can achieve a minimum permittivity of 1.25, which yields a maximum beam-steering angle of 44 degrees. The present disclosure may enable practical low-loss, low-cost, and compact beam-steering lens antennas for mmWave MIMO with wide beamsteering angles.

Figure 9A:
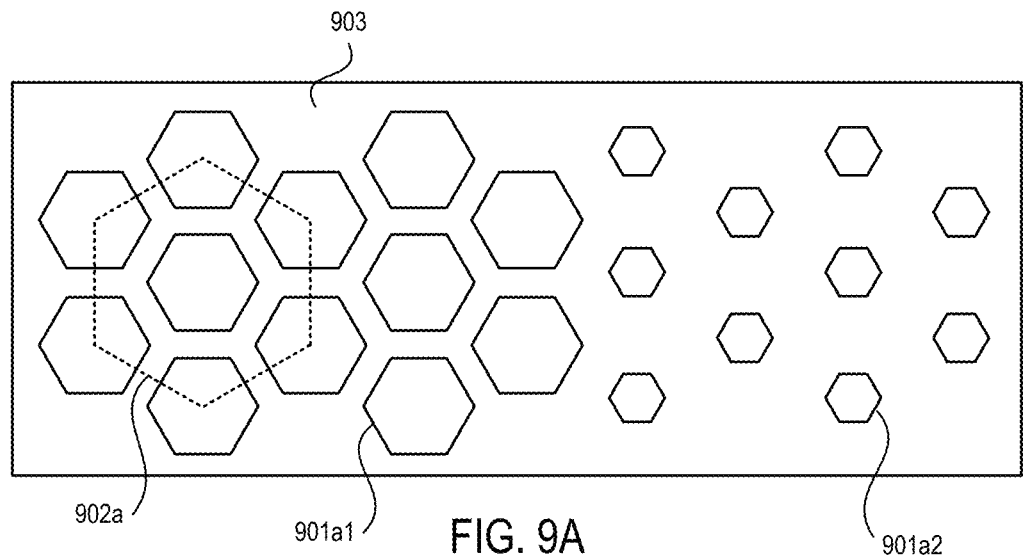
FIGS. 9A-9B illustrate exemplary films in accordance with various aspects of the present disclosure.
Figure 9B:
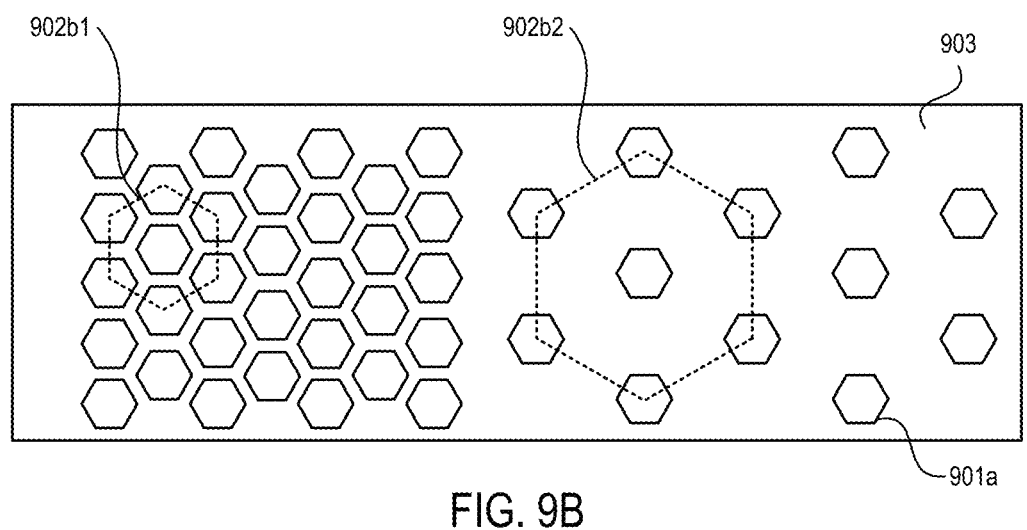

In some implementations, the permittivity of a particular film varies along its lateral dimension. FIGS. 9A-9B respectively illustrate two such examples. In FIG. 9A, a film 903 includes a first plurality of hexagonal voids 901a1 on a hexagonal lattice 902a in a first portion of the film 903, and a second plurality of hexagonal voids 901a2 on the same hexagonal lattice 902a in a second portion of the film 903. In FIG. 9B, a film 903 includes a plurality of hexagonal voids 901 all having the same dimension, disposed on a first hexagonal lattice 902b1 in a first portion of the film and on a second hexagonal lattice 902b2 in a second portion of the film 903. In both illustrations, the effective permittivity $\epsilon_{\it eff}$ in the first portion is lower than the effective permittivity $\epsilon_{\it eff}$ in the second portion. Any number of different lattice sizes and/or void sizes may be implemented on a single film such that the effective permittivity $\epsilon_{\it eff}$ may be controlled to have any desired in-plane variation. A series of films with in-plane permittivity variation may be stacked with one another to form a lens. One such example is illustrated in FIGS. 10A-10B.

Figure 10A:
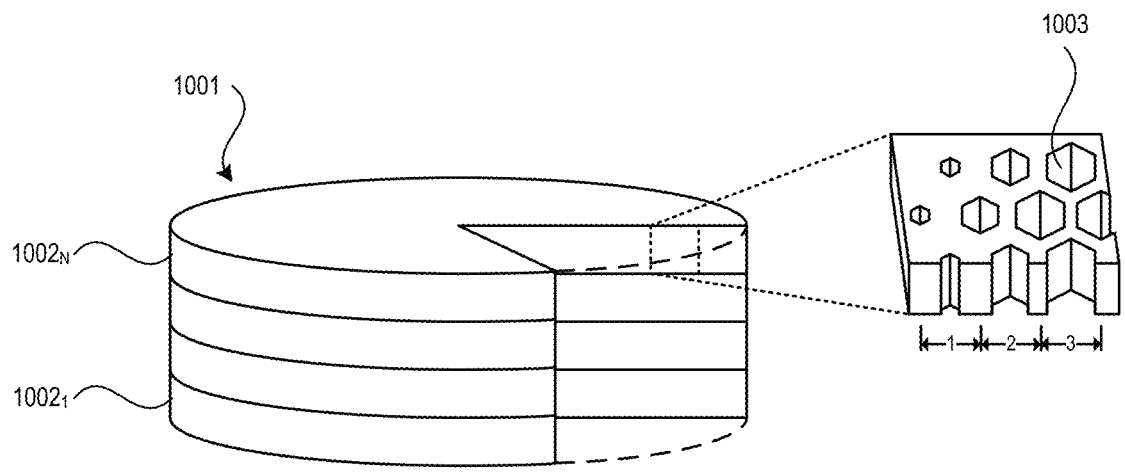
FIGS. 10A-10B illustrate dimensions and characteristics of an exemplary lens in accordance with various aspects of the present disclosure.

Particularly, FIG. 10A illustrates a perspective view of a lens 1001 formed as a stack of N individual layers 10021 to 1002N. Within a particular layer 1002, a plurality of hexagonal voids 1003 are provided. As illustrated in FIG. 10A, the dimension of the hexagonal voids 1003 increases with the radial distance from a center of rotation of the lens 1001 to a center of the hexagonal voids 1003, such that cells within region 1 have smaller voids 1003 compared to cells within region 2, which in turn have smaller voids 1003 compared to cells within region 3. In practice, however, the dimension of the hexagonal voids 1003 may be controlled so as to achieve any desired in-plane variation. Furthermore, the dimension and variation thereof may differ between layers 1002, such that the lens 1001 may have an axially-varying permittivity in addition or alternative to a radially-varying permittivity.

Figure 10B:
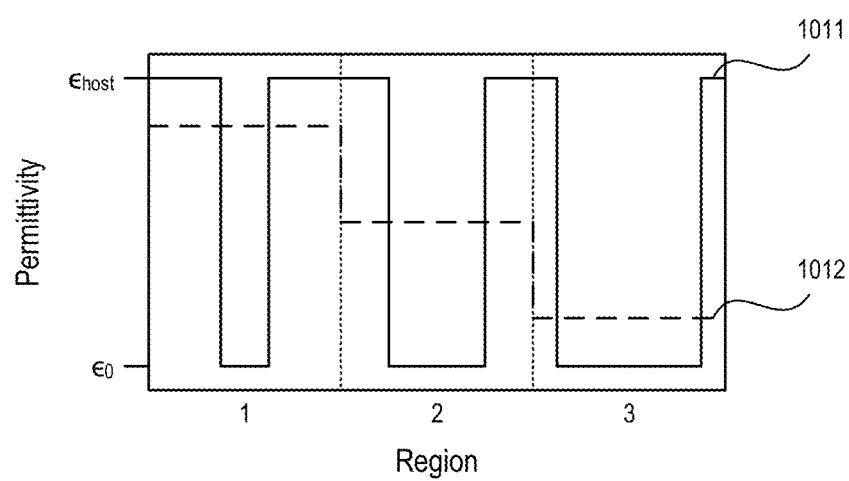

FIG. 10B illustrates an exemplary permittivity profile for a portion of one layer 1002. In particular, FIG. 10B illustrates the instantaneous permittivity $\epsilon_r$ 1011 and the effective cell permittivity $\epsilon_{\it eff}$ 1012 for regions 1-3 illustrated in FIG. 10A. The instantaneous permittivity $\epsilon_r$ 1011 is equal to the permittivity of the host material, $\epsilon_{host}$, at locations where the host material of the lens 1001 is present and is equal to the permittivity of the background (for example, air), $\epsilon_0$, at locations where a void 1003 is present. The effective cell permittivity $\epsilon_{\it eff}$ 1012 is described in expression (9) above. Generally, the effective cell permittivity $\epsilon_{\it eff}$ 1012 is a function of the fill factor, α. For a given perforated dielectric cell with a single vertically-uniform void 1003, the fill factor α is the ratio of the void area to the cell area. In cases where the sidewalls of the voids 1003 are not exactly vertical (which may be due to manufacturing tolerances, for example), the fill factor α may be generalized as the volumetric ratio of the void 1003 to the total unit cell.

Various features and advantages of the present disclosure are set forth in the following claims.

What is claimed is:
1. A silicon film comprising:
   a first plurality of voids, wherein respective ones of the first plurality of voids have a regular n-gon geometry, and
   the first plurality of voids are arranged on a regular n-gon lattice having a first size;
   wherein:
   the silicon film has an effective permittivity between about 1.0 and about 11.8 based on the size of the respective voids having a regualr n-gon geometry;
   the effective permittivity is a function of a measured fill factor of the respective voids having a regular n-gon geometry, where the effective permittivity decreases as the measured fill factor increases; and the respective voids having a regular n-gon geometry comprise a characteristic dimension from about 25 µm to about 175 µm.

2. The film of claim 1, wherein n equals 3, 4, or 6.

3. The film of claim 1, wherein the film has a minimum effective permittivity less or equal to about 1.25.

4. The film of claim 1, wherein the first plurality of voids are formed by a deep reactive ion etch process.

5. The film of claim 1, wherein a refractive index of the film varies based on a location along the film.

6. The film of claim 1, further comprising:
a second plurality of voids, wherein respective ones of the second plurality of voids have a regular n-gon geometry, and
the second plurality of voids are arranged on a regular n-gon lattice having a second size different from the first size.

7. An optical element comprising:
a first silicon film including a first plurality of voids; and
a second silicon film disposed on the first silicon film, the second silicon film including a second plurality of voids, wherein respective ones of the first plurality of voids have a regular m-gon geometry,
the first plurality of voids are arranged on a regular m-gon lattice,
respective ones of the second plurality of voids have a regular n-gon geometry,
the second plurality of voids are arranged on a regular n-gon lattice, and
the first silicon film has a first refractive index and the second silicon film has a second refractive index;
wherein:
the first silicon film and the second silicon film have an effective permittivity between about 1.0 and about 11.8 based on the size of the respective voids having a regular m-gon or n-gon geometry;
the effective permittivity is a function of a measured fill factor of the respective voids having a regular m-gon or n-gon geometry, where the effective permittivity decreases as the measured fill factor increases; and
the respective voids having a regular m-gon or n-gon geometry comprise a characteristic dimension from about 25 µm to about 175 µm.

8. The optical element of claim 7, wherein m equals 3, 4, or 6 and n equals 3, 4, or 6.

9. The optical element of claim 8, wherein m and n are equal to one another.

10. The optical element of claim 7, wherein the first refractive index is different from the second refractive index.

11. The optical element of claim 7, wherein the first refractive index varies based on a first location along the first film and the second refractive index varies based on a second location along the second film.

12. A method of manufacturing a silicon film, comprising:
providing a silicon wafer; and
forming a first plurality of voids in the silicon wafer, wherein respective ones of the first plurality of voids have a regular n-gon geometry, and
the first plurality of voids are arranged on a regular n-gon lattice having a first size;
wherein:
the silicon film has an effective permittivity between about 1.0 and about 11.8 based on the size of the respective voids having a regular n-gon geometry;
the effective permittivity is a function of a measured fill factor of the respective voids having a regualr n-gon geometry, where the effective permittivity decreases as the measured fill factor increases; and
the respective voids having a regular n-gon geometry comprise a characteristic dimension from about 25 µm to about 175 µm.

13. The method of claim 12, wherein forming the first plurality of voids includes a photolithographic drilling process.

14. The method of claim 12, wherein forming the first plurality of voids includes a deep reactive ion etch process.

15. The method of claim 12, wherein n equals 3, 4, or 6.

16. The method of claim 12, wherein the silicon film has a minimum effective permittivity less than or equal to about 1.25.

17. The method of claim 14, wherein a refractive index of the film varies based on a location along the film.

18. The method of claim 12, further comprising:
forming a second plurality of voids in the silicon wafer, wherein respective ones of the second plurality of voids have a regular n-gon geometry, and
the second plurality of voids are arranged on a regular n-gon lattice having a second size different from the first size.

* * * * *